United States Patent [19]
Strahan

[11] 3,811,027
[45] May 14, 1974

[54] CONTROL SYSTEM FOR GAS-SHIELDED ELECTRIC WELDERS

[76] Inventor: Ronald R. Strahan, 5408 N.E. Circle Dr., Kansas City, Mo. 64119

[22] Filed: Aug. 29, 1973

[21] Appl. No.: 392,688

[52] U.S. Cl. .............................. 219/74, 219/131 R
[51] Int. Cl. .............................................. B23k 9/16
[58] Field of Search ................... 219/74, 131 R, 136

[56] References Cited
UNITED STATES PATENTS

| | | | |
|---|---|---|---|
| 2,630,513 | 3/1953 | Redmond | 219/136 |
| 2,862,098 | 11/1958 | Hasselhorn | 219/74 |
| 3,042,791 | 7/1962 | Reeh | 219/74 X |
| 3,118,051 | 1/1964 | Dixon | 219/131 X |
| 3,497,670 | 2/1970 | Thostrup | 219/74 X |

Primary Examiner—J. V. Truhe
Assistant Examiner—N. D. Herkamp
Attorney, Agent, or Firm—John A. Hamilton

[57] ABSTRACT

A control system for electric welders wherein the torch electrode, and the welding site, is protected by a zone of surrounding inert gas supplied thereto, the control system consisting of a pedal operated regulator operable to supply inert gas at a continuously variable pressure through a range extending well above the pressure required to supply the gas shield at the torch, the pressurized gas serving by variations of its pressure to actuate and control the electric portion of the welder as desired, and to supply gas to the torch continuously at the desired low pressure and flow rate before, during and after actuation of the electric circuit.

7 Claims, 1 Drawing Figure

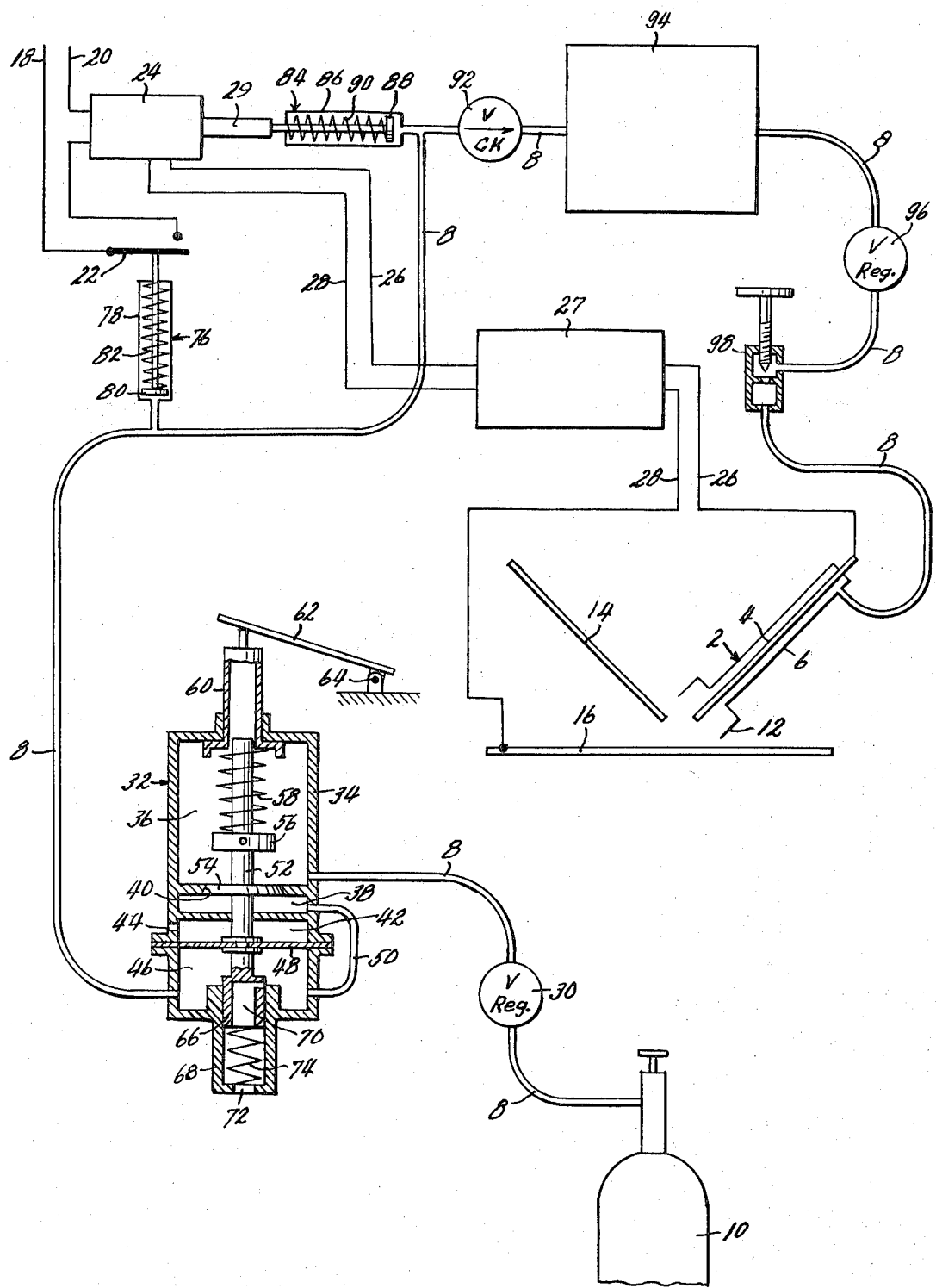

CONTROL SYSTEM FOR GAS-SHIELDED ELECTRIC WELDERS

This invention relates to new and useful improvements in electric welders, and has particular reference to that class of devices commonly known as TIG welders, the initials standing for Tungsten-Inert Gas. In this class of welders, there is utilized a hand-held torch, used in conjunction with a welding rod, including an electrode, usually formed of tungsten, and with which the welding arc is struck, and means for enveloping the tip of the electrode and the welding site with a constant flow of inert gas, such as argon, to prevent excessive oxidation and burning of the metals while extremely hot. This type of welder permits efficient welding in difficult situations, such as with aluminum and stainless steel, thin sheets, and the like, but presents certain problems. The flow of inert gas should be maintained from a time just before the arc is struck, all during the welding operation, and for a time after the arc is cut off sufficient for the electrode tip and welding site to cool sufficiently that excessive oxidation will not occur in the absence of the protective gas shield. At the same time, the gas itself is rather expensive, and should not be wasted. Also, the amperage of the electric arc must be under the constant control of the operator in order that he may adjust the heat generated by the arc to changing conditions at the welding site, which vary according to the work thickness or position, mass of the weld required, and other factors, and which the operator can determine by observing the size and condition of the pool of molten metal at the welding site. The requirement that the operator have constant control of the gas, and electric amperage of the arc, presents problems of an adequate control system which have long been troublesome in the art. The operator's hands are fully occupied in manipulating the torch and the welding rod, so that he has no hands free to operate manual controls. Also, he must wear a welding mask, and has little if any ability to look at controls, or to see anything but the incandescently hot welding site.

Accordingly, the principal object of the present invention is the provision of a control system for welders of this type which answers all of the above described problems, placing the gas flow and control of the electrical system of the arc, including continuous variability of its amperage, under the control of a single foot pedal which may be depressed by the operator.

Generally, this object is accomplished by providing an inert gas flow conduit between a pressurized source and the welding torch, and inserting successively in said conduit a first pressure regulator operable by a foot pedal to deliver a continuously variable pressure with a maximum well above the pressure required to supply the torch, a pressure sensitive actuator operable to actuate the electrical system of the welder at a pressure higher than the torch pressure, a pressure sensitive controller operable by pressure variation in a range above the actuator pressure to provide continuous variation of the electric arc current, and a second pressure regulator operable to reduce the gas pressure to a level suitable for supplying the torch.

Another object is the provision of means for insuring extremely rapid response of the controller to reductions of the pressure setting of the first pressure regulator, as for example by bleeding gas from the conduit downstream from said first regulator whenever said regulator is closed. The controller response would otherwise be slow due to the relatively low pressure required at the torch.

A further object is the provision of means for insuring a flow of gas to the torch for a limited time after the gas source has been disconnected by closure of the first regulator, in order that the electrode and welding site may be cooled before exposure to air. This may be done by insertion of a check valve and gas reservoir in the gas conduit downstream from the controller.

Other objects are simplicity and economy of construction, and efficiency and dependability of operation.

With these objects in view, as well as other objects which will appear in the course of the specification, reference will be had to the accompanying drawing, wherein the single view is a schematic diagram of a control system for gas-shielded electric welders embodying the present invention.

In the drawing, the numeral 2 applies generally to the torch element of a TIG welder, which includes an electrode 4, at least the tip portion of which is formed of tungsten, and a surrounding nozzle 6 to which an inert gas, usually argon, is supplied by a conduit 8 which is connected, through various other elements of the control system to be described, with a gas tank 10 containing the gas at a high pressure, usually when fully charged at about 2,000 p.s.i. The nozzle 6 is provided with a bell-mouth 12 surrounding the tip of the electrode, so as to discharge the inert gas therearound. The torch is used in conjunction with a welding rod 14 to form a weld on work-piece 16, when an electric arc is established between the electrode and the work-piece.

The electric circuit for the arc is drawn from line wires 18 and 20, which supply current through a pressure actuated switch 22 to the primary windings of a transformer 24, the secondary windings of said transformer being connected by wires 26 and 28 to electrode 4 and to work-piece 16, through an electrical device 27 which may function to change the polarity of the current supplied to the electrode, render said current alternating or direct, or change the frequency thereof. Such devices are however well known in the art, and as it is not pertinent per se to the present invention, it is not here detailed. Transformer 24 is provided with a movable core 29, and is to be understood as being of a type wherein the amperage of the current supplied to wires 26-28 varies continuously upwardly with movement of said core to the left, as viewed in the drawing.

The pressure required to supply gas to the torch is very slight, since the torch flow required is very low, in perhaps a range of 10-20 cubic feet per hour, requiring a pressure of only ounces, while tank 10 carries pressure when fully charged of perhaps 2,000 p.s.i. In accordance with the present invention, gas from tank 10 first passes through a first pressure regulator 30 of a standard type which reduces its pressure to a level well above the required torch pressure, say 50 p.s.i. for example. This regulator delivers gas to a second pressure regulator designated generally by the numeral 32 which is operable to deliver gas at any continuously variable pressure between zero and 50 p.s.i. As diagrammed, regulator 32 consists of a housing 34 having an upper inlet chamber 36 into which conduit 8 extends, a next lower chamber 38 divided from chamber 36 by a partition having a valve seat opening 40 formed therein, a next lower vent chamber 42 vented to the atmosphere at 44, and a bottom outlet chamber 46 from which conduit 8 extends, and which is divided from chamber 42 by a flexible diaphragm 48. Chambers 38 and 46 are interconnected by a by-pass conduit 50. Disposed in the housing is a vertical spindle 52 carrying a valve disc 54 which cooperates with seat opening 40. Above said valve disc a collar 56 is fixed on the spindle, which supports the lower end of a compression spring 58 engaged at its upper end by a plunger 60 carried slidably in the top wall of the housing and extending thereabove, being depressible by a foot pedal 62 pivoted to a fixed support at 64. Spindle 52 extends downwardly from the valve disc through chambers 38 and 42, is fixed in the mid-portion of diaphragm 48, and is provided at its lower end with a plunger 66 carried for vertical sliding movement in a downward extension 68 of the housing. Plunger 66 is provided with a passage 70 which opens into housing extension 68, and which opens into housing chamber 46 only when the spindle has moved upwardly to bring valve 54 nearly to a closed position. Housing extension 68 is vented to the atmosphere at its lower end, as at 72. A spring 74 in housing extension 68 biases the spindle upwardly.

Spring 74 of sufficient strength to hold valve 54 normally closed against gas pressure delivered by regulator 30, but when pedal 62 is depressed, spring 58 is compressed to open the valve, whereupon gas flows through the seat opening 40, chamber 38 and by-pass conduit 50 to chamber 46 and on through conduit 8. Pressure builds up in chamber 46 and presses diaphragm 48 and spindle 52 upwardly, throttling valve 54 until the pressure in chamber 46 is balanced by the added tension of spring 58. In this manner, a pressure continuously variable between zero and the pressure supplied by regulator 30 can be supplied to conduit 8 downstream from regulator 32. For a purpose which will presently appear, it will be seen that whenever valve 54 is closed, or throttled down to a flow rate preferably representing a minimum continuously operating condition of the system, passage 70 is connected to chamber 46 and vents said chamber to the atmosphere.

Connected into conduit 8 downstream from regulator 32 is an actuator 76 for switch 22, consisting of a gas cylinder 78 connected into conduit 8, and carrying a piston 80 movable by gas pressure to close switch 22, this movement being resisted by a spring 82 which is pre-tensioned to provide closure of the switch only when the gas pressure has risen well above the required torch pressure, say 25 p.s.i. in the example being followed.

Next connected into conduit 8 is a controller 84 for transformer core 29, consisting of a gas cylinder 86 connected into conduit 8 and carrying a piston 88 connected directly to core 29 and movable by increases in gas pressure to move core 29 to increase the amperage delivered to secondary leads 26–28 of the transformer. This movement is resisted by a spring 90. This spring is selected and pre-tensioned so that it will not permit piston 88 to commence movement until the gas pressure exceeds that required to close switch 22, but to permit full range adjustment of the core within the maximum pressure available from regulator 32. In the example being followed, full range adjustment of core 29 should be provided at pressures between 30 and 50 p.s.i.

Downstream from actuator 84, there are inserted in conduit 8 first a check valve 92 operable to permit flow of gas only toward torch 2, then a gas reservoir 94 of any desired pre-determined capacity, then a pressure regulator 96 adapted to reduce the pressure in conduit 8 to a level suitable for supplying gas to the torch, and finally a needle valve 98 by means of which the rate of gas flow to the torch may be still more finely adjusted. The flow rate is often quite critical, and its adjustment often requires the use of a gas flow meter, not shown.

In operation, the critical adjustment of the gas flow rate at the torch will ordinarily be made before the arc is struck, while the operator still has his hands free. He may do this by depressing pedal 62 to initiate the gas supply, then making any necessary adjustments of regulator 96 and needle valve 98, without striking the arc. To, to make a weld, the operator positions the torch and welding rod, and his mask, and depresses pedal 62 sufficiently that regulator 32 not only supplies gas to the torch at the pre-determined flow rate, but also supplies sufficient gas pressure first to cause actuator 76 to close switch 22 to connect transformer 24 to the line wires, and second to cause controller 84 to move transformer core 29 to cause a current to be delivered to the arc leads 26–28. The arc is then struck by a momentary brushing contact of electrode 4 to the workpiece 16, and the welding proceeds in a normal manner. If by observation the operator determines that a higher or lower amperage at the arc is required, he correspondingly depresses pedal 62 or allows it to rise, which adjusts the pressure delivered by regulator 32 to controller 84, which produces a movement of transformer core 28 to respectively increase or decrease the output amperage, as required. If the operator calls for a sudden reduction of amperage by releasing pedal 62 completely or to a great extent, the pressure drop in regulator chamber 46 would normally be slow, since gas is leaving the system at torch 2 only very slowly, were it not for the fact that whenever regulator valve 54 closes or nearly closes, vent passage 70 to the atmosphere opens, and a very rapid pressure drop at controller 84 occurs, and the response of the controller is rendered nearly instantaneous. A slow response to a signal calling for reduced amperage can often result in damaged work, and the provision of a vent at regulator 32 is therefore very important. The venting action occurs only when the amperage reductions called for are sudden or radical, resulting in complete or nearly complete closure of valve 54. When the reductions called for are less rapid or extreme, the venting is not required. The response of controller 84 to calls for more amperage is substantially instantaneous at all times.

The operation of controller 84 through its entire range cannot affect switch 22, which is always closed before controller 84 can move, nor does it affect the flow rate of gas to the torch, which is controlled by regulator 96. Likewise, the arc can never be struck without a protective shield of gas around the electrode and welding site, since the gas flow is already established before switch 22 is closed.

When the weld is complete and regulator 32 is completely closed by releasing pedal 62, pressure in conduit 8 to the point of check valve 92 is vented, but said check valve immediately closes, preventing any reverse flow and trapping gas in reservoir 94 at whatever pressure was last called for at controller 84. The trapped gas continues to flow through regulator 96, which is set to pass gas at a much lower pressure, to the torch. Thus gas continues to flow from the torch after the arc is shut off, for a predetermined time fixed by the capacity of the reservoir. This continued flow serves to protect the tip of the electrode, and the welding site, against exposure to air for a time sufficient to permit cooling thereof to a temperature low enough to prevent undue oxidation thereof.

While I have shown and described a specific embodiment of my invention, it will be readily apparent that many minor changes of structure and operation could be made without departing from the spirit of the invention.

What I claim as new and desire to protect by Letters Patent is:

1. In an electric arc welder including a torch electrode, a nozzle operable when connected to a pressurized source of inert gas to eject said gas in a protective shield enveloping the operative tip of said electrode, a conduit connecting said nozzle to said source, an operative electric circuit for supplying current to said electrode, and control means in said circuit mechanically operable to vary the current in said circuit continuously over an operating range, a control system comprising:

a. a variable pressure regulator in said conduit intermediate said source and said nozzle, and manually operable to deliver gas toward said nozzle selectively at any pressure within a continuously variable range, and
 b. a pressure-actuated controller connected in said conduit intermediate said pressure regulator and said nozzle, and operable by variations in conduit pressure to adjust said electrical control means to deliver currents of different intensities to said electrode circuit, whereby said current is rendered generally proportional to the pressure delivered by said pressure regulator.

2. A control system as recited in claim 1 wherein said pressure regulator is operable to deliver gas at pressures substantially above that required to supply gas to said nozzle, said controller being operable to adjust said current control means through its entire range of adjustment by variation of conduit pressure in a range of pressures also above that required to supply said nozzle, and with the addition of a second pressure regulator connected in said conduit intermediate said controller and said nozzle and operable to deliver gas toward said nozzle at the lower pressure required, whereby the gas flow rate at said nozzle is not affected by pressure variations in said conduit prior to said second pressure regulator.

3. A control system as recited in claim 1 wherein said controller requires an elevated conduit pressure to initiate operation thereof, and with the addition of:
 a. an electrical switch operable when closed to complete said electrode circuit, and
 b. a pressure-operated actuator connected in said conduit intermediate said pressure regulator and said nozzle, and operable responsively to an elevated conduit pressure to close said switch, the conduit pressure required to cause closure of said switch being less than that required to initiate operation of said controller.

4. A control system as recited in claim 2 with the addition of:
 a. an electrical switch operable when closed to complete said electrode circuit, and
 b. a pressure-operated actuator connected in said conduit intermediate said pressure regulator and said second pressure regulator, and operable by elevation of the conduit pressure to close said switch, the conduit pressure required to cause closure of said switch being less than that required to initiate operation of said controller, but greater than the delivery pressure of said second pressure regulator.

5. A control system as recited in claim 2 wherein said pressure regulator includes means operable whenever it is manually operated to produce a sudden reduction of pressure in the downstream portion of said conduit to vent said downstream portion of the conduit to the atmosphere, whereby the speed of response of said controller is increased.

6. A control system as recited in claim 1 with the addition of:
 a. a check valve connected in said conduit intermediate said controller and said nozzle and operable to prevent reverse flow of gas in said conduit, and
 b. an enlarged gas reservoir interconnected in said conduit intermediate said check valve and said nozzle.

7. A control system as recited in claim 2 with the addition of:
 a. a check valve connected in said conduit intermediate said controller and said second pressure regulator, and
 b. an enlarged gas reservoir connected in said conduit intermediate said check valve and said second pressure regulator.

* * * * *